United States Patent
Kuwabara

(10) Patent No.: US 7,397,033 B2
(45) Date of Patent: Jul. 8, 2008

(54) METHOD OF MAKING CHARACTERISTIC LINE

(75) Inventor: Takao Kuwabara, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 311 days.

(21) Appl. No.: 11/362,743

(22) Filed: Feb. 28, 2006

(65) Prior Publication Data

US 2006/0192124 A1    Aug. 31, 2006

(30) Foreign Application Priority Data

Feb. 28, 2005   (JP)   ............... 2005-053399

(51) Int. Cl.
  *G01J 5/02*   (2006.01)
(52) U.S. Cl. .................. 250/341.5
(58) Field of Classification Search .............. 250/341.5
  See application file for complete search history.

(56) References Cited

U.S. PATENT DOCUMENTS 5,327,210 A * 7/1994 Okui et al. .................. 356/218

2003/0197847 A1* 10/2003 Shinoda ...................... 355/67
2005/0083557 A1*  4/2005 Nagano ...................... 358/487

FOREIGN PATENT DOCUMENTS

JP       2001-137175 A     5/2001

* cited by examiner

*Primary Examiner*—David P. Porta
*Assistant Examiner*—Djura Malevic
(74) *Attorney, Agent, or Firm*—Sughrue Mion, PLLC

(57) ABSTRACT

When making a characteristic line, a plurality of different small amount reference light beams is caused to impinge upon the photodetector element, a zero-light signal value is obtained by extrapolation of the relation between the small amount side reference light beams and the signal values which are respectively output from the photodetector element in response to the small amount side reference light beams, a large amount reference light signal value which is output when a large amount light beam impinges upon the photodetector element is obtained, and a characteristic line representing a relation between the amount of light which the photodetector element receives and a value of the signal which is output from the photodetector element is made on the basis of the zero-light signal value and the large amount reference light signal value.

4 Claims, 3 Drawing Sheets

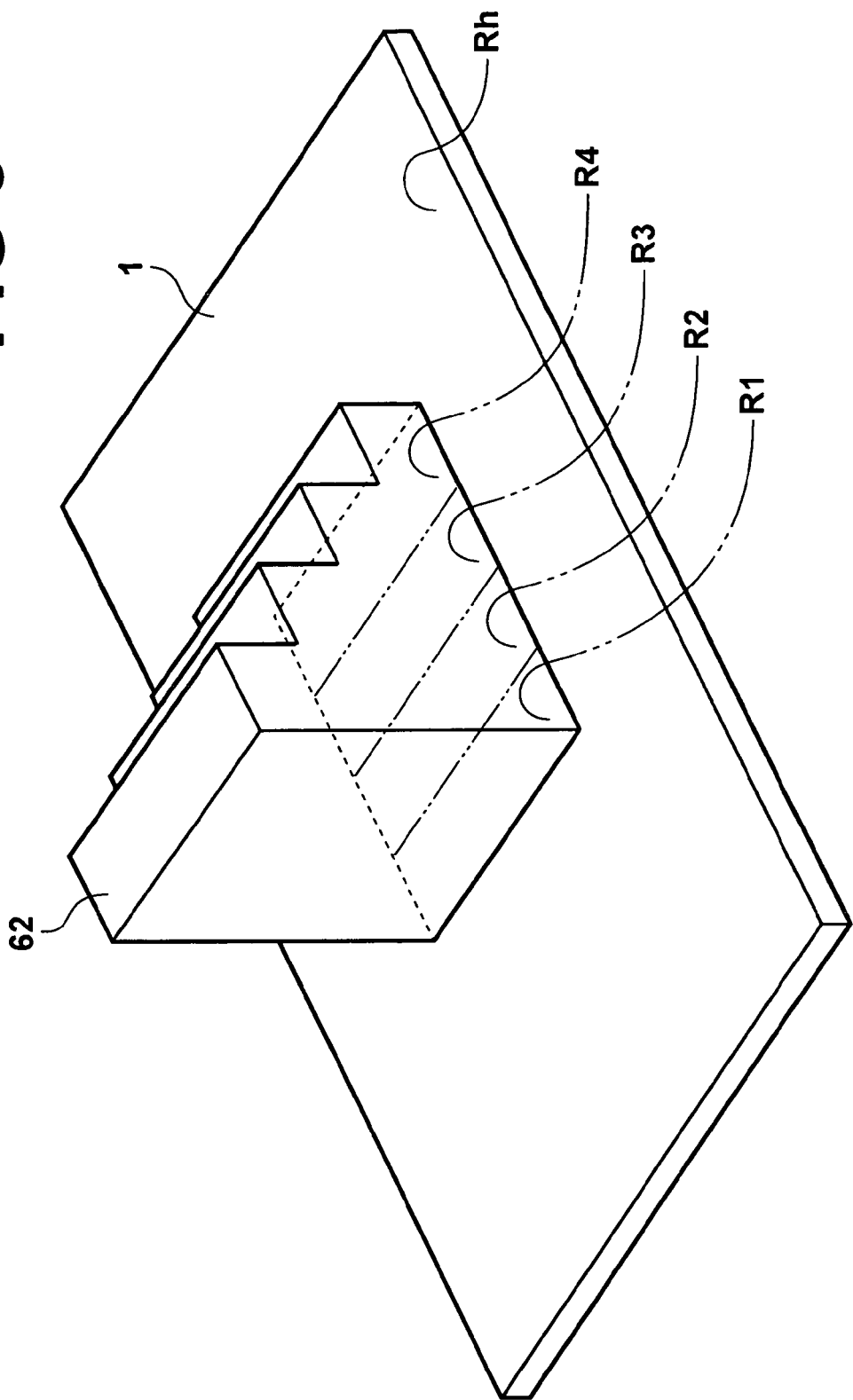

METHOD OF MAKING CHARACTERISTIC LINE

BACKGROUND OF THE INVENTION

1. Field of the Invention

This invention relates to a method of making a characteristic line, and more particularly to a method of making a characteristic line representing the relation between a signal value of a photodetector element which outputs a signal of a value depending upon the amount of light which it receives and the amount of light which the photodetector element receives.

2. Description of the Related Art

When a photodetector element which outputs a signal of a value depending upon the amount of light which it receives is used, there has been known a system where a characteristic line representing the relation between a signal value of the photodetector element and the amount of light which it receives is obtained and the amount of light which the photodetector element receives is obtained from the signal value output from the photodetector element on the basis of the characteristic line. (See Japanese Unexamined Patent Publication No. 2001-137175)

As a procedure for obtaining the characteristic line, there has been known, for instance, that where a value of a signal output from a photodetector element with the photodetector element receiving no light and at the same time while a value of a signal output from the photodetector element with the photodetector element receiving an amount of light near to a maximum which the photodetector element can receive is obtained, and the characteristic line is obtained on the basis of the relation between the amount of light which the photodetector element receives and the output of the photodetector element of each of the pairs of amount of light and the output. That is, in the procedure, the signal value output from the photodetector element is converted to a light amount by the use of the characteristic line.

When such a characteristic line is applied to a line sensor in which a number of photodetector elements are arranged in one direction, there has been known a method in which the characteristic line is obtained element to element and the signal values output from the respective photodetector elements are weighted so that they output the same signal values when they receive the same amount of light.

However, in the photodetector element, the relation between the amount of light which the photodetector element receives and the output of the photodetector element is slightly nonlinear on the side where the amount of light which the photodetector element receives is small. Accordingly, there has been a demand to obtain a more accurate amount of light even on the side of small amount of light.

To the contrast, a method where relations of a plurality of pairs of amount of light and the signal value are obtained and stored in a look-up table on the side of small amount of light and the signal value exhibiting the amount of light which the photodetector element actually receives is obtained without use of the characteristic line by interpolation between points on a two-dimensional coordinate system representing a relation between the amount of light which the photodetector element receives and the signal value (one axis representing the amount of light and the other axis representing the signal value) on the basis of the look-up table is conceivable.

However, the method using the look-up table is disadvantageous in that the system is complicated since the look-up table must be referred to every time the amount of light which the photodetector element receives (will be referred to as "the photodetector receiving light amount", hereinbelow) is obtained. Further, attempt to apply the method to a line sensor will further complicate the system and the problem will become more serious since the look-up tables must be prepared for all the photodetectors forming the line sensor.

Accordingly, it is required to make more accurate the relation between the photodetector receiving light amount and the signal value on the side of small amount of light while using the characteristic line.

SUMMARY OF THE INVENTION

In view of the foregoing observations and description, the primary object of the present invention is to provide a method of making a characteristic line which can exhibit more accurately the relation between the photodetector receiving light amount and the signal value on the side of small amount of light.

In accordance with the present invention, there is provided a method of making a characteristic line representing a relation between a signal value of a photodetector element which photoelectrically converts light it receives and outputs a signal a value of which depends on the amount of light it receives and the amount of light the photodetector element receives wherein the improvement comprises the steps of causing a plurality of small amount reference light beams which have different predetermined amounts of light in the range of small amount side in the light receiving range of the photodetector to impinge upon the photodetector element, obtaining a zero-light signal value which is estimated to be output from the photodetector element when the amount of light impinging upon the photodetector element is zero by extrapolation of the relation between the small amount side reference light beams and the signal values which are respectively output from the photodetector element in response to the small amount side reference light beams, obtaining a large amount reference light signal value which is output from the photodetector element when a large amount light beam having a predetermined amount of light in the range of large amount side in the light receiving range of the photodetector element is caused to impinge upon the photodetector element, and making a characteristic line representing a relation between the amount of light which the photodetector element receives and a value of the signal which is output from the photodetector element in response to its receipt of the amount of light on the basis of the zero-light signal value and the large amount reference light signal value.

The photodetector element may be a photodetector element of a line sensor in which a number of photodetector elements are arranged in one direction.

Further, the photodetector element may be a photodetector element which detects photostimulated luminescence which is emitted from a stimulable phosphor sheet upon irradiation of stimulating light and represents a radiation image recorded on the stimulable phosphor sheet.

The range of the small amount side is in the range where the relation between the photodetector receiving light amount and the signal value which is output from the photodetector element upon receipt of light of the amount is to be used at a higher accuracy, and the range of the large amount side is a range larger than the range of the small amount side.

In accordance with the method of the present invention, since a plurality of small amount reference light beams which have different predetermined amounts of light in the range of small amount side in the light receiving range of the photodetector are caused to impinge upon the photodetector element, a zero-light signal value which is estimated to be output from the photodetector element when the amount of light impinging upon the photodetector element is zero is obtained by extrapolation of signal values which are respectively output from the photodetector element in response to the small amount side reference light beams, and a characteristic line representing a relation between the amount of light which the photodetector element receives and a value of the signal which is output from the photodetector element in response to its receipt of the amount of light is made on the basis of the zero-light signal value and the large amount reference light signal value described above, the characteristic line can exhibit more accurately the relation between the photodetector receiving light amount and the signal value on the side of small amount of light as compared with conventional characteristic lines.

When the photodetector element is used to detect photostimulated luminescence which is emitted from a photostimulable phosphor sheet upon irradiation of stimulating light and represents a radiation image recorded on the photostimulable phosphor sheet, a more accurate characteristic line can be used, since the photostimulated luminescence is weak and the linearity of the relation between the amount of light which the photodetector element receives and the output of the photodetector element deteriorates in the range of small amount side in the light receiving range of the photodetector.

BRIEF DESCRIPTION OF THE DRAWINGS

FIG. 3 is a view showing the stepped block used in making the characteristic line.

DESCRIPTION OF THE PREFERRED EMBODIMENT

Figure 1:
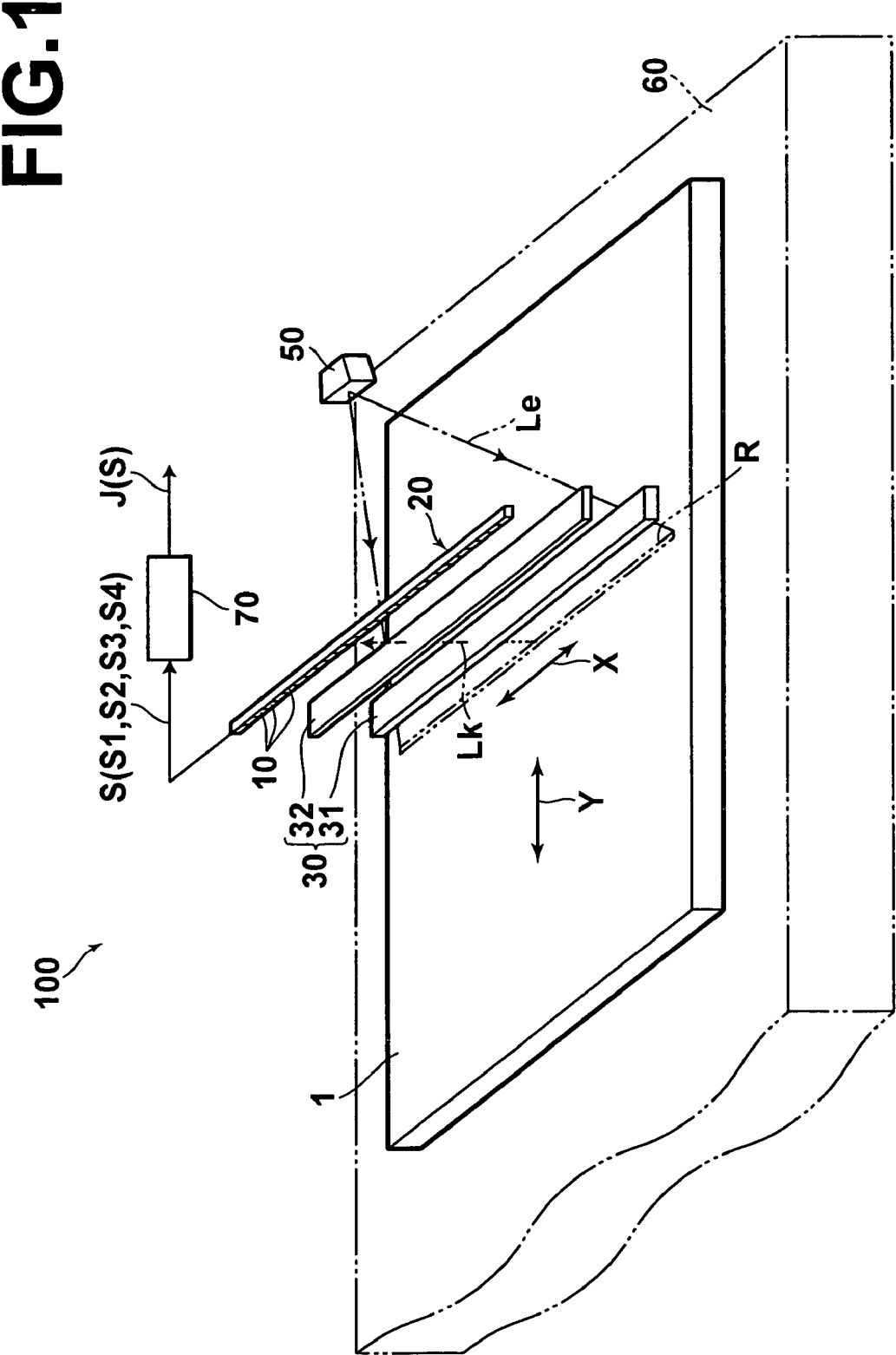
FIG. 1 is a view showing a radiation image read-out apparatus used in an embodiment of the method of making a characteristic line of the present invention.
Figure 2:
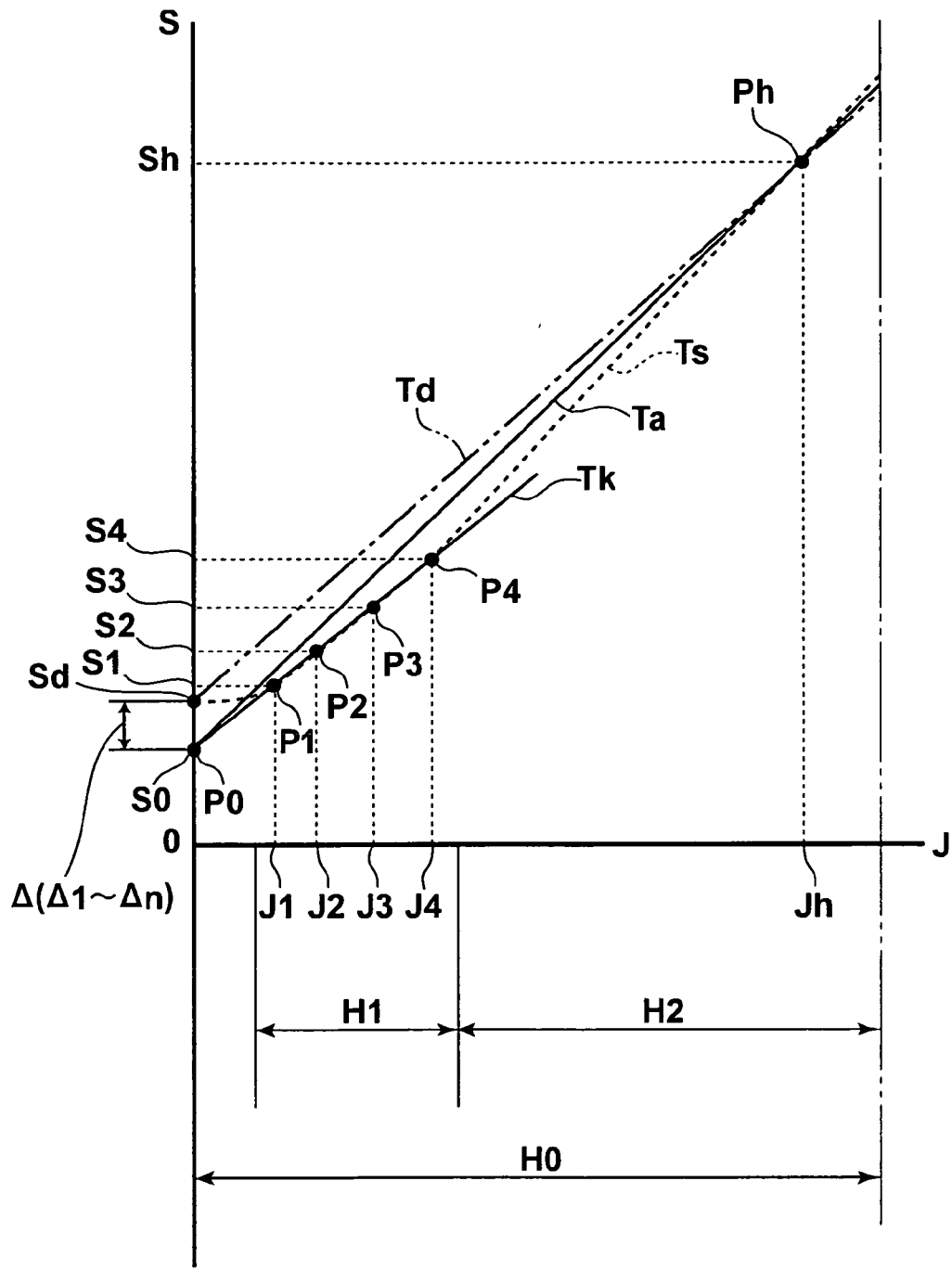
FIG. 2 is a view for illustrating making a characteristic line.

An embodiment of the present invention will be described with reference to the drawings, hereinbelow. FIG. 1 is a view showing a radiation image read-out apparatus used in an embodiment of the method of making a characteristic line of the present invention, FIG. 2 is a view for illustrating making a characteristic line, and FIG. 3 is a view showing the stepped block used in making the characteristic line. In FIG. 2, the abscissa represents the photodetector receiving light amount and the ordinate represents the signal value output from the photodetector element.

The method of making a characteristic line in accordance with this embodiment is for making a characteristic line for a photodetector element 10 which photoelectrically converts light it receives to output a signal the value of which depends upon the amount of light it receives and the characteristic line represents the relation between the signal value of the photodetector element and the amount of light it receives.

A plurality of the photodetector elements 10 are arranged in one direction to form a line sensor 20.

The line sensor 20 detects photostimulated luminescence Lk which is emitted from a photo-stimulable phosphor sheet 1 upon irradiation of stimulating light Le and represents a radiation image recorded on the photo-stimulable phosphor sheet 1, and forms the following radiation image read-out apparatus 100.

The radiation image read-out apparatus 100 comprises a stimulating light projecting portion 50 which projects a linear stimulating light beam Le extending in a main scanning direction (in the direction of arrow X in FIG. 1) onto a photostimulable phosphor sheet 1 on which a radiation image has been recorded, a conveyor portion 60 which conveys the photo-stimulable phosphor sheet 1 relative to the stimulating light beam Le in a sub-scanning direction (in the direction of arrow Y in FIG. 1) intersecting the main scanning direction, the line sensor 20 which is formed of a plurality of the photodetector elements 10 which are arranged in the main scanning direction and each of which photoelectrically converts photostimulated luminescence Lk emitted from the photo-stimulable phosphor sheet 1 upon irradiation by the stimulating light beam Le to output a signal the value S of which represents the amount of the photostimulated luminescence it receives, and an imaging optical system 30 comprising an imaging lens 31 formed by a number of refractive index profile lenses to image on the photodetector element 10 a projecting area R on the photodetector element 10 which extends in the main scanning direction and is irradiated by the stimulating light beam Le and a stimulating light cut filter 32 which cuts the stimulating light beam Le and transmits the photostimulated luminescence Le, and the like.

The radiation image read-out apparatus 100 further comprises a signal value converting portion 70 which converts the signal value S output from the photodetector element 10 to the amount of light j(S) estimated to be received by the photodetector element 10.

The photo-stimulable phosphor sheet 1 comprises photostimulable phosphors which store part of the radiation energy upon irradiation by radiation such as X-rays and emit the photostimulated luminescence according to the amount of stored radiation energy when subsequently exposed to stimulating light such as visible light. By the use of the photostimulable phosphor sheet 1 comprising such photo-stimulable phosphors, it is able to record a radiation image of an object on the photo-stimulable phosphor sheet 1, then project the stimulating light Le onto the photo-stimulable phosphor sheet 1 to cause it to emit the photostimulated luminescence Lk and photoelectrically read the obtained photostimulated luminescence Lk by the photodetector elements 10 forming the line sensor 20, thereby obtaining signal values S representing the radiation image.

A method of making the characteristic line will be described in detail, hereinbelow. The following description will be made on the characteristic line representing a relation between the signal value and the photodetector receiving light amount for each photodetector element forming the line sensor 20.

As shown in FIG. 2, a plurality of small amount reference light beams which have different predetermined amounts of light J1, J2, J3, J4 in the range H1 of small amount side in the light receiving range H0 of the photodetector element 10, that is, in the range where a more accurate relation between the amount of light which the photodetector 10 receives and the signal value thereof is desired, are discretely caused to impinge upon the photodetector 10.

The plurality of small amount reference light beams may be caused to impinge upon the photodetector element 10, for instance, in the following manner.

As shown in FIG. 3, a stepped block 62 of stainless steel or aluminum having steps contiguous to each other in a direction perpendicular to the longitudinal direction of the line sensor 20 (the main scanning direction) is positioned on a photostimulable phosphor sheet 1 from which the residual energy of radiation has been erased and then radiation Xe is projected onto the photo-stimulable phosphor sheet 1 from a radiation source 64 above the stepped block 62.

The radiation Xe impinges upon the photo-stimulable phosphor sheet 1 through the stepped block 62 while energy of radiation thereof is absorbed by the stepped block 62. The radiation Xe also impinges upon the photo-stimulable phosphor sheet 1 without passing through the stepped block 62.

As a result, radiation is directly (attenuated through the stepped block 62) and indirectly (without attenuation by the stepped block 62) recorded on the photo-stimulable phosphor sheet 1. The area of the photo-stimulable phosphor sheet 1 where the highest step of the stepped block 62 is positioned will be referred to as "area R1", the area of the photo-stimulable phosphor sheet 1 where the second highest step of the stepped block 62 is positioned will be referred to as "area R2", and the areas of the photo-stimulable phosphor sheet 1 where the steps of the stepped block 62 are positioned will be referred to as "area R3, and R4" respectively in the order of height of the steps.

Then the radiation image read-out apparatus 100 reads the photo-stimulable phosphor sheet 1 on which the radiation image representing the stepped block 62 is recorded.

While the stimulating light Le is projected onto the photo-stimulable phosphor sheet 1 by the stimulating light projecting portion 50 with the photo-stimulable phosphor sheet 1 conveyed in the sub-scanning direction by the conveyor portion 60, the line sensor 20 obtains a signal value S representing the amount of the photostimulated luminescence Lk which is generated in the projecting area R of the stimulating light Le onto the photo-stimulable phosphor sheet 1 and received by each photodetector element 10 through the imaging portion 30 to be photoelectrically converted.

The radiation part of the energy of which is stored in the photo-stimulable phosphor sheet 1 through each step of the stepped block 62 and the intensity of the photostimulated luminescence Lk emitted from the area R1, R2, R3 or R4 on the photo-stimulable phosphor sheet 1 on which the stepped block 62 has been placed upon stimulation by the stimulating light Le have been set in advance. Accordingly, the amount of light received by the photodetector element 10 when the photostimulated luminescence Lk emitted from the area Rl, R2, R3 or R4 on the photo-stimulable phosphor sheet 1 on which the stepped block 62 has been placed is received by the photodetector element 10 is determined in advance.

The photostimulated luminescence emitted from the areas R1, R2, R3 or R4 upon stimulation by the stimulating light Le and received by the photodetector elements 10 are the plurality of small amount reference light beams and amounts thereof are J1, J2, J3 and J4.

In the manner described above, the plurality of small amount reference light beams having amounts J1, J2, J3 and J4 which are different from each other can be caused to discretely impinge upon the photodetector elements 10.

The relation between the different amounts of light J1, J2, J3 and J4 and the signal values S1, S2, S3 and S4 emitted corresponding to the amounts of light J1, J2, J3 and J4 is determined as shown in FIG. 2.

A zero-light signal value which is estimated to be output from the photodetector element 10 when the amount of light impinging upon the photodetector element 10 is zero is obtained by extrapolation of the relation between the amounts of light and the signal values. That is, point P0 representing a zero-light signal value S0 at which a straight line Tk obtained by linear regression of points P1, P2, P3 and P4 representing the relation between the amounts of light J1, J2, J3 and J4 and the signal values S1, S2, S3 and S4 intersects the ordinate representing the signal value S when the amount of light J impinging upon the photodetector element 10 is zero is obtained. Curve Ts passing through the points P1, P2, P3 and P4 in FIG. 2 represents the strict relation between the amount of light which the photodetector element 10 receives and the signal value output therefrom.

Then, a large amount reference light signal value which is output from the photodetector element 10 when a large amount light beam having a predetermined amount of light in the range of large amount side H2 in the light receiving range H0 of the photodetector element 10 is caused to impinge upon the photodetector element 10 is obtained.

That is, the photostimulated luminescence Lk which is output from area Rh on the photo-stimulable phosphor sheet 1 where the stepped block 62 is not placed and is received by the photodetector element 10 is the large amount reference light and the amount light which the photodetector element 10 receives at that time is represented by Jh. With this, the large amount reference light whose amount of light Jh is predetermined can be caused to impinge upon the photodetector element 10.

Then, the relation between the amount of light Jh and the large amount reference light signal value Sh which is output from the photodetector element 10 when it receives the amount of light Jh is determined as shown in FIG. 2, and a point Ph representing the relation between the amount of light Jh and the large amount reference light signal value Sh is determined.

By joining the point P0 representing a zero-light signal value S0 obtained by extrapolation described above and the point Ph representing the signal value Sh output from the photodetector element 10 when it receives the large amount reference light, a characteristic line Ta representing a relation between the amount of light the photodetector element 10 receives and the signal value the photodetector element 10 outputs in response to the receipt of the amount of light can be made.

The point P0 representing a zero-light signal value S0 is obtained for each of the photodetector elements 10 forming the line sensor 20. Fluctuation by the photodetector elements 10 due to noise and the like sometimes gives rise to a problem. The difference $\Delta$ ($\Delta 1$ to $\Delta n$) between the signal value Sd output from the photodetector element 10 when no light impinges thereupon and the zero-light signal value S0 of the photodetector element 10 often exhibits a gentle change for the photodetector elements 10 arranged in one direction described above. The difference $\Delta$ ($\Delta 1$ to $\Delta n$) is obtained for each of the photodetector elements 10 and a high-frequency fluctuation is removed from the difference $\Delta$ ($\Delta 1$ to $\Delta n$) for each of the photodetector elements 10 by carrying out filter processing or the like on each of the differences $\Delta$ ($\Delta 1$ to $\Delta n$). By obtaining the point P0 representing the zero-light signal value S0 for each of the photodetector elements 10 on the basis of the signal values Sd and the values obtained by carrying out the processing on the differences $\Delta$ ($\Delta 1$ to $\Delta n$), a more accurate characteristic line can be obtained.

The method of determining the amounts of light J1, J2, J3 and J4 may be as follows.

That is, a large amount of radiation is projected onto the areas R1, R2, R3, R4 and Rh of the photo-stimulable phosphor sheet 1 so that the amount of light the photodetector element 10 receives corresponding to the photostimulated luminescence emitted from the area R1 (which provides a minimum amount of light the photodetector element 10 receives) falls in the range of large amount side H2 in the light receiving range H0. Then the photo-stimulable phosphor sheet 1 is read and the amounts of light J1', J2', J3', J4' and Jh' for the amount of the photostimulated luminescence emitted from each of the areas R1, R2, R3, R4 and Rh are obtained. The amounts of light J1, J2, J3, J4 can be determined on the basis of the ratios to the amount of light Jh', (J1/Jh', J2/Jh', J3/Jh', J4/Jh') according to the formulae J1=(J1'/Jh')×Jh, J2=(J2'/Jh')×Jh, J3=(J3'/Jh')×Jh, J4=(J4'/Jh')×Jh.

The characteristic line made by the conventional method of making a characteristic line is a straight line Td passing through the point Pd representing the signal value Sd output from the photodetector element 10 when no light impinges thereupon and the point Ph described above as shown in FIG. 2. That is, the characteristic line Ta of the present invention more accurately shows the relation between the photodetector receiving light amount and the signal value on the side of small amount of light as compared with the conventional characteristic line Td. In other words, the characteristic line Ta of the present invention better approximates the relation between the photodetector receiving light amount and the signal value on the side of small amount of light to the curve Ts strictly representing the relation between the photodetector receiving light amount and the signal value as compared with the conventional characteristic line Td.

The characteristic line and the method of making a characteristic line need not be limited to apply to the photodetector element forming the line sensor which receives the photostimulated luminescence emitted from the photostimulable phosphor sheet but may be applied to any photodetector element so long as it outputs a signal value according to the amount of light it receives by photoelectric conversion thereof.

What is claimed is:

1. A method of making a characteristic line representing a relation between a signal value of a photodetector element which photoelectrically converts light it receives and outputs a signal a value of which depends on the amount of light it receives and the amount of light the photodetector element receives wherein the improvement comprises the steps of causing a plurality of small amount reference light beams which have different predetermined amounts of light in the range of small amount side in the light receiving range of the photodetector to impinge upon the photodetector element, obtaining a zero-light signal value which is estimated to be output from the photodetector element when the amount of light impinging upon the photodetector element is zero by extrapolation of the relation between the small amount side reference light beams and the signal values which are respectively output from the photodetector element in response to the small amount side reference light beams, obtaining a large amount reference light signal value which is output from the photodetector element when a large amount light beam having a predetermined amount of light in the range of large amount side in the light receiving range of the photodetector element is caused to impinge upon the photodetector element, and making a characteristic line representing a relation between the amount of light which the photodetector element receives and a value of the signal which is output from the photodetector element in response to its receipt of the amount of light on the basis of the zero-light signal value and the large amount reference light signal value.

2. A method as defined in claim 1 in which the photodetector element is a photodetector element of a line sensor in which a number of photodetector elements are arranged in one direction.

3. A method as defined in claim 2 in which the photodetector element is a photodetector element which detects photostimulated luminescence which is emitted from a photostimulable phosphor sheet upon irradiation of stimulating light and represents a radiation image recorded on the photostimulable phosphor sheet.

4. A method as defined in claim 1 in which the photodetector element is a photodetector element which detects photostimulated luminescence which is emitted from a photostimulable phosphor sheet upon irradiation of stimulating light and represents a radiation image recorded on the photostimulable phosphor sheet.

* * * * *